(12) United States Patent
Ishiwata

(10) Patent No.: US 10,314,322 B2
(45) Date of Patent: Jun. 11, 2019

(54) OILY FOOD FOR INHIBITING MIGRATION OF WATER IN FROZEN CONFECTIONERY

(71) Applicant: FUJI OIL HOLDINGS INC., Osaka (JP)

(72) Inventor: Akiyuki Ishiwata, Ibaraki (JP)

(73) Assignee: FUJI OIL HOLDINGS INC., Osaka (JP)

( * ) Notice: Subject to any disclaimer, the term of this patent is extended or adjusted under 35 U.S.C. 154(b) by 402 days.

(21) Appl. No.: 14/917,577

(22) PCT Filed: May 29, 2014

(86) PCT No.: PCT/JP2014/064220
§ 371 (c)(1),
(2) Date: Mar. 9, 2016

(87) PCT Pub. No.: WO2015/045480
PCT Pub. Date: Apr. 2, 2015

(65) Prior Publication Data
US 2016/0227815 A1    Aug. 11, 2016

(30) Foreign Application Priority Data
Sep. 25, 2013 (JP) ................. 2013-198570
Mar. 25, 2014 (JP) ................. 2014-061166

(51) Int. Cl.
A23G 9/32 (2006.01)
A23D 9/00 (2006.01)
A23G 1/30 (2006.01)
A23G 9/50 (2006.01)

(52) U.S. Cl.
CPC ........... *A23G 9/322* (2013.01); *A23D 9/00* (2013.01); *A23G 1/305* (2013.01); *A23G 9/50* (2013.01); *A23G 9/506* (2013.01); *A23V 2002/00* (2013.01)

(58) Field of Classification Search
CPC .......... A23D 9/00; A23G 1/00; A23G 1/305; A23G 9/322; A23G 9/50; A23G 9/506; A23V 2002/00; A21D 2/16
USPC ........................................................ 426/306
See application file for complete search history.

(56) References Cited

U.S. PATENT DOCUMENTS

| | | | | |
|---|---|---|---|---|
| 5,505,982 A | * | 4/1996 | Krawczyk | A21D 2/188 426/660 |
| 5,674,475 A | * | 10/1997 | Dahms | A61K 8/06 424/59 |
| 2004/0024233 A1 | * | 2/2004 | Endo | A61K 8/39 554/174 |
| 2004/0247774 A1 | * | 12/2004 | Christiansen | A23G 1/36 426/660 |
| 2005/0202132 A1 | * | 9/2005 | Wolever | A23G 3/54 426/138 |

FOREIGN PATENT DOCUMENTS

| | | |
|---|---|---|
| JP | S56-500873 | 7/1981 |
| JP | 63-094940 | 4/1988 |
| JP | 63-226245 | 9/1988 |
| JP | H3-210152 | 9/1991 |
| JP | H5-316931 | 12/1993 |
| JP | 11-289985 | 10/1999 |
| JP | 11289985 A * | 10/1999 |
| JP | 2004-147524 | 5/2004 |
| JP | 2005-312333 | 11/2005 |
| JP | 2006-187249 | 7/2006 |
| JP | 2007-528729 | 10/2007 |
| JP | 2008-539702 | 11/2008 |
| JP | 2011-205958 | 10/2011 |
| JP | 2012-110268 | 6/2012 |
| JP | 2012-249617 | 12/2012 |

OTHER PUBLICATIONS

Cebula et al., Chocolate and couvertures: applications in ice cream pp. 163-182. Source:Science and Technology of Enrobed and Filled Chocolate, Confectionery and Bakery Products. D. J. Cebula Talbot, Geoff. (2009). Woodhead Publishing, pp. 163-182. (Year: 2009).*
"International Search Report (Form PCT/ISA/210) of PCT/JP2014/064220", dated Sep. 2, 2014, pp. 1-6.

* cited by examiner

*Primary Examiner* — Jyoti Chawla
(74) *Attorney, Agent, or Firm* — JCIPRNET

(57) ABSTRACT

The problem of providing an oily food for inhibiting water migration in frozen confectionery, the oily food being highly versatile and more effective in inhibiting water migration and being capable of application by spraying is addressed. The problem can be solved by use of an oily food for inhibiting water migration in frozen confectionery, the oily food satisfying the following requirements: 1. having a yield value of 1.7 to 12 Pa at 40° C.; 2. having plastic viscosity of 70 to 260 mPa·s at 40° C.; 3. having a value of yield value/plastic viscosity of 10 or greater; and 4. having an oil content of 44 to 80 wt %.

9 Claims, No Drawings

OILY FOOD FOR INHIBITING MIGRATION OF WATER IN FROZEN CONFECTIONERY

CROSS-REFERENCE TO RELATED APPLICATION

This application is a 371 application of an International PCT application serial no. PCT/JP2014/064220, filed on May 29, 2014, which claims the priority benefits of Japan Application No. 2013-198570, filed on Sep. 25, 2013, and Japan Application No. 2014-061166, filed on Mar. 25, 2014. The entirety of each of the above-mentioned patent applications is hereby incorporated by reference herein and made a part of this specification.

FIELD OF THE INVENTION

The invention relates to an oily food for inhibiting water migration in frozen confectionery.

DESCRIPTION OF THE RELATED ART

Conventionally, in frozen confectionery which uses a cone cup or a monaka (bean-jam-filled wafer) shell as an edible container, chocolate or the like has often been utilized as a coating material for the inside (hereinafter also referred to as "internal phase") of the edible container. The purpose of the above is usually to inhibit migration of water from ice creams as the content to the edible container, so as to maintain a good texture of the edible container.

Patent Document 1 describes "a method of producing a cone ice, characterized by pouring a foam-containing chocolate material into a cone vessel; then, inserting an insert form having a similar shape to the inside of the cone vessel into the chocolate material; after a gap between the cone vessel and the insert form has been filled with the chocolate material, removing the insert form to provide a foam-containing chocolate material layer on the inside of the cone vessel; and then, filling a frozen material."

Patent Document 2 describes "a moisture-proof method for cone cups, characterized by, while inclining and rotating an edible container such as a cone cup relative to a vertical axis, causing a fluid foamed ice coating chocolate to flow down the inside of the edible container and congeal, so as to form a foamed ice coating chocolate layer on an inner wall of the cup."

Patent Document 3 describes "a monaka shell having a chocolate coating of at least 300 µm in thickness on a surface in contact with ice cream in the monaka," and describes "injection using a hot airless pulse spraying method" as a means therefor.

Patent Document 4 describes "a method of producing a monaka shell with a chocolate coating film, characterized by coating chocolate on the inside of the monaka shell" including "arranging endless masking belts respectively between the monaka shells, the masking belts traveling along the moving direction of the monaka shells."

Patent Document 5 describes, as a "moisture-proof layer forming process for forming a moisture-proof layer made of chocolates," "while supplying liquid chocolates to a front surface of a saucer-shaped rotary disk, rotating the rotary disk, so as to atomize the supplied chocolates by a centrifugal force; and moving the rotary disk relative to the edible container so as to coat the atomized chocolates on the inside of the edible container."

Patent Document 6 describes "chocolates containing 25 to 45 wt % of a fat, having a yield value of 1 Pa or less at 45° C. and apparent viscosity of 6000 cP or less at 45° C., and containing one or more kinds of fibers selected from the group consisting of cacao fiber and pulp fiber in a total amount of 3 wt % or more."

Patent Document 7 is an application entitled "viscosity-lowering agent of chocolate material," wherein it is mentioned "the chocolate material that has reduced fluidity is increased in yield value."

Regarding production of composite frozen confectionery, Patent Document 8 describes a method of isolating a container made of a baked wafer from a water-containing food by spraying a lipid-containing food on the container with a spray gun.

PRIOR-ART DOCUMENTS

Patent Documents

Patent Document 1: JP H3-210152
Patent Document 2: JP H5-316931
Patent Document 3: JP 2004-147524
Patent Document 4: JP 2005-312333
Patent Document 5: JP 2006-187249
Patent Document 6: JP 2012-110268
Patent Document 7: JP H11-289985
Patent Document 8: JP S56-500873

SUMMARY OF THE INVENTION

Problems to be Solved by the Invention

The subject of the invention is to provide an oily food for inhibiting water migration in frozen confectionery which uses an edible container, and particularly to provide an oily food being high versatile and more effective in inhibiting water migration.

Means for Solving the Problems

The inventor firstly conducted verification of the prior art.

In the methods of Patent Documents 1 and 2, the foam-containing chocolate material must be employed, which limits the texture of the product and thus reduces versatility. In addition, in the method of Patent Document, it is necessary to prepare the insert form during production and complexity is thus increased.

In Patent Document 3, a device for performing "hot airless pulse spraying" must be introduced anew, which presumably leads to a cost increase. Thus, the technique is far from being generally usable.

In Patent Document 4, the masking belts and so on are employed, and it is necessary to make significant changes to the production device, which also leads to a cost increase. Thus, the technique is far from being generally usable. Similarly, in Patent Document 5, it is also necessary to make significant changes to the production device.

Patent Document 6 focuses on yield value. It is described in Comparative Examples 1 and 2 that the coating operation cannot be performed when the yield value is high.

Patent Document 8 describes spraying of a very wide range of lipid-containing foods by means of a spray gun. However, the effects on an edible container which, like a monaka shell, has convex and concave portions, are not described. The effects also cannot be confirmed in the verification conducted by the inventor.

The inventor conducted verification of inhibition of water migration in an ice monaka or the like by means of an oily food such as chocolate. As a result, it was found that water migration easily occurs particularly in convex and concave portions of a monaka shell, and the reason is that the coating formed of the oily food tends to become thinner at the convex and concave portions. This tendency was more pronounced particularly when the oily food was applied by spraying.

As a result of earnest studies further conducted by the inventor, an inference was made that in view of "yield value" and "plastic viscosity" among characteristics of a chocolate material as a fluid, if the yield value is high and the plastic viscosity is kept low, the internal phase of the monaka shell can be reliably coated even if the monaka shell has a large number of convexities and concavities. Also, it was found that the yield value can be increased and the plastic viscosity can be kept low by employing a specific emulsifier. Also, it was found that by employing such a chocolate material, coating can be performed with a constant thickness also on the convex and concave portions, and sufficient barrier properties are shown so that water migration from the ice cream can be inhibited. Also, it was found that this oily food is applicable to various coating operations including spraying. Thus, the invention was completed.

That is, the invention relates to the following aspects.

(1) An oily food satisfying the following requirements:
1. having a yield value of 1.7 to 12 Pa at 40° C.;
2. having plastic viscosity of 70 to 260 mPa·s at 40° C.;
3. having a value of yield value/plastic viscosity of 10 or greater; and
4. having an oil content of 44 to 80 wt %.

(2) The oily food described in (1), satisfying the following requirements:
1. having a yield value of 3 to 12 Pa at 40° C.;
2. having plastic viscosity of 100 to 180 mPa·s at 40° C.;
3. having a value of yield value/plastic viscosity of 25 or greater; and
4. having an oil content of 46 to 70 wt %.

(3) The oily food described in (1) or (2), containing 0.2 to 2.5 wt % of a sorbitol type sorbitan monofatty acid ester having an HLB of 5 to 10.

(4) The oily food described in (3), wherein the fatty acid of the sorbitol type sorbitan monofatty acid ester is saturated.

(5) The oily food described in (1) or (2), containing 0.2 to 5 wt % of a distilled diglycerin monofatty acid ester having an HLB of 5 to 10.

(6) Use of the oily food described in (1) or (2) as an internal phase coating agent for an edible container in a frozen confection which uses the edible container.

(7) Use of the oily food described in (3) as an internal phase coating agent for an edible container in a frozen confection which uses the edible container.

(8) Use of the oily food described in (4) as an internal phase coating agent for an edible container in a frozen confection which uses the edible container.

(9) Use of the oily food described in (5) as an internal phase coating agent for an edible container in a frozen confection which uses the edible container.

(10) A method of producing frozen confectionery which uses an edible container, including coating the oily food described in (1) or (2) onto an internal phase of the edible container in a frozen confection which uses the edible container.

(11) A method of producing frozen confectionery which uses an edible container, including coating the oily food described in (3) onto an internal phase of the edible container in a frozen confection which uses the edible container.

(12) A method of producing frozen confectionery which uses an edible container, including coating the oily food described in (4) onto an internal phase of the edible container in a frozen confection which uses the edible container.

(13) A method of producing frozen confectionery which uses an edible container, including coating the oily food described in (5) onto an internal phase of the edible container in a frozen confection which uses the edible container.

(14) A method of producing frozen confectionery which uses an edible container, including coating, by spraying, the oily food described in (1) or (2) onto an internal phase of the edible container in a frozen confection which uses the edible container.

(15) A method of producing frozen confectionery which uses an edible container, including coating, by spraying, the oily food described in (3) onto an internal phase of the edible container in a frozen confection which uses the edible container.

(16) A method of producing frozen confectionery which uses an edible container, including coating, by spraying, the oily food described in (4) onto an internal phase of the edible container in a frozen confection which uses the edible container.

(17) A method of producing frozen confectionery which uses an edible container, including coating, by spraying, the oily food described in (5) onto an internal phase of the edible container in a frozen confection which uses the edible container.

Effects of the Invention

According to the invention, an oily food for inhibiting water migration in frozen confectionery which uses an edible container can be provided. The oily food is high versatile and more effective in inhibiting water migration.

DESCRIPTION OF THE EMBODIMENTS

The oily food in the invention means a food having an oil content of 44 to 80 wt % and being solid at 0° C. If the oil content is too low, the effect of inhibiting water migration may be reduced. The oil content is more desirably 45 to 75 wt %, and even more desirably 46 to 70 wt %.

In the invention, the oily food is intended to be applied by spraying. Therefore, it is preferred that the oil content be in the "even more desired range."

Specifically, the oily food in the invention includes mainly chocolate or quasi chocolate, and those classified as chocolate-utilizing foods, but is not limited thereto.

In the invention, chocolate-utilizing food is usually used as a typical example of the oily food. Thus, the following description takes a chocolate-utilizing food as an example. In addition, in the invention, the chocolate-utilizing food is sometimes simply referred to as "chocolate."

The yield value of the chocolate is expressed as energy required for initiating flow of the chocolate. When the yield value is high, it becomes difficult for the chocolate to flow. A specific yield value can be obtained by plotting a relationship between shear stress and shear rate, and translating the same into a mathematical formula using the Casson approximation formula or the like based on a measurement method of apparent viscosity. In an example of the measurement method, the yield value can be calculated by measuring the shear stress at a shear rate of 2 (l/s) to 50 (l/s) at 40° C. using RheolabQC (made by Anton Paar Co.), and translating the shear stress into a mathematical formula using the Casson approximation formula.

The plastic viscosity mentioned in the invention means a rheological constant representing viscosity of a Bingham fluid after the Bingham fluid has started flowing. The greater the value, the larger the flow resistance, which corresponds to a coefficient of viscosity of a Newtonian fluid.

It is necessary that the yield value of the oily food in the invention at 40° C. be 1.7 to 12 Pa, more desirably 2.1 to 12 Pa, even more desirably 2.3 to 12 Pa, and most desirably 3 to 12 Pa.

In addition, it is necessary that the plastic viscosity of the oily food in the invention at 40° C. be 70 to 260 mPa·s, more desirably 80 to 200 mPa·s, even more desirably 90 to 190 mPa·s, and most desirably 100 to 180 mPa·s.

When the yield value and the plastic viscosity are too high or too low, water migration resistance of the oily food may be reduced.

In the invention, it is necessary that a value of "yield value/plastic viscosity" be 10 or greater, desirably 13 or greater, and more desirably 15 or greater. The value is most desirably 25 or greater. Generally, in the oily food, when the yield value is increased, the plastic viscosity is also increased accordingly. However, such an oily food is usually not suitable for spray application. In the invention, as compared to the plastic viscosity, the yield value is characterized by being suitably equal to or higher than a certain value. Thus, in the case where only the yield value and the value of plastic viscosity fall within the specified ranges, if the value of "yield value/plastic viscosity" is too small, it will be difficult for the invention to solve the problems. Moreover, the value of "yield value/plastic viscosity" is calculated from the yield value and the value of plastic viscosity respectively at 40° C. In this case, the calculation is performed by using mPa as a unit of yield value and mPa·s as a unit of plastic viscosity.

The frozen confectionery mentioned in the invention means ice cream or the like distributed in a frozen state, and particularly means a product that may encounter the problem of water migration over time, wherein the ice cream or the like is entirely or partially enclosed by an edible container such as a cone or a monaka shell. Specific examples include products using a cone or ice monaka, wherein the effects of the invention can be more suitably exhibited on ice monaka. That is, the frozen confectionery mentioned in the invention is desirably an ice monaka. The ice monaka is one of popular frozen confections, but the problem of water migration to the monaka shell is still not completely solved.

The oily food of the invention is employed for frozen confectionery which uses an edible container and is highly effective in inhibiting water migration from the ice cream or the like to the edible container such as a monaka shell or a cone, and is thus particularly suitable for such uses. Specifically, the oily food shows an effect of inhibiting an increase in moisture during a storage test after the oily food has been applied to a monaka shell by a predetermined method and the ice cream has been filled. A more specific evaluation method is described in examples.

Moreover, the term "water migration" mentioned in the invention refers to, in frozen confectionery such as, typically, an ice monaka, in which a surface of ice cream or the like is entirely or partially covered with a monaka shell or the like, the migration of water from the ice cream or the like to the monaka shell or the like. In this case, the cover material is not limited to the monaka shell, but also includes a cone or cookie for soft ice cream. Nonetheless, the invention is characterized by being capable of inhibiting water migration even in a cover material which, like the monaka shell, has a large number of convexities and concavities. Thus, if the cover material is a monaka shell, the effect is suitably exhibited.

That is, an oily food capable of inhibiting water migration even in a cover material which, like a monaka shell, has a large number of convexities and concavities, is the oily food according to the invention.

Moreover, in a more specific definition of the monaka shell for ice monaka, the monaka shell uses starch such as mochi or the like as a main constituent and is prepared by baking, and usually has a structure in which the content such as ice cream or the like is entirely or partially covered with two or more shells.

When evaluated from the standpoint of appearance, in the structure in which the content is entirely covered, the convex portion faces the outer periphery. In addition, in order to increase the entire strength or to make it easier to split the ice monaka for eating, the concave portion is usually provided parallel to the sides.

In the invention, that having convex and concave portions with a radius of curvature of 5 mm or less is defined as a "monaka shell." The effects of the invention are more remarkably exhibited when the radius of curvature of the convex and concave portions is 4 mm or less, and even more remarkably exhibited when the radius of curvature is 3 mm or less. Moreover, the aforementioned radius of curvature is a value of the inside of the monaka shell.

The oily food according to the invention can be provided for coating the edible container by spray application.

The spray mentioned in the invention is expressed as a sprayer, and various devices can be used. The invention is particularly characterized by showing remarkable water migration resistance in an ice monaka or the like even when application is performed by spraying. Herein, specific criteria for determining the presence or absence of water migration resistance are described in the examples.

The physical properties of the oily food for inhibiting water migration in frozen confectionery according to the invention can be preferably realized by containing 0.2 to 2.5 wt % of a sorbitol type sorbitan monofatty acid ester having an HLB of 5 to 10. Herein, the sorbitol type sorbitan monofatty acid ester is a sorbitan monofatty acid ester and is characterized by containing a sorbitol type ester in an amount of 30 to 90%, preferably 40 to 85%. When the content of the sorbitol type is too high or too low, the physical properties according to the invention may not be exhibited.

Moreover, among sorbitan fatty acid esters, the sorbitol type refers to those obtained by esterifying sorbitol and fatty acid while carrying out a condensation reaction for forming sorbitan thereon at the same time; the sorbitan type refers to those obtained by subjecting only sorbitol to a condensation reaction first to form sorbitan, refining the sorbitan and then subjecting it together with fatty acid to an esterification reaction.

In the case of the sorbitan type, since refinement is once performed on the sorbitan, a better color tone or flavor is obtained as compared to the sorbitol type. However, in the invention, in view of controlling the physical properties, the sorbitol type sorbitan monofatty acid ester is desirably used.

The sorbitol type sorbitan monofatty acid ester can also be specified according to hydroxyl value. That is, the hydroxyl value of the sorbitol type sorbitan monofatty acid ester employed in the invention is desirably 150 to 550, more desirably 250 to 550, and even more desirably 300 to 550. When this value is too large or too small, the physical properties desired for the oily food may not be obtained.

The HLB of the sorbitol type sorbitan monofatty acid ester is more desirably 5 to 9. When the HLB is too high or too low, the physical properties according to the invention may not be exhibited.

In addition, the fatty acid to be bonded is more desirably saturated.

The content of the sorbitol type sorbitan monofatty acid ester in the oily food is desirably 0.2 to 2.5 wt %, more desirably 0.3 to 2.2 wt %, and even more desirably 0.4 to 2.0 wt %. If the content is too low, the physical properties according to the invention may not be exhibited. In addition, if the content is too high, the texture may be affected adversely. In addition, the barrier properties after application may become worse.

The physical properties of the oily food for inhibiting water migration in frozen confectionery according to the invention can also be realized by containing a distilled diglycerin monofatty acid ester having an HLB of 5 to 10. The amount thereof is desirably 0.2 to 5 wt %. The HLB is more desirably 5 to 8. When the HLB is too high or too low, the physical properties according to the invention may not be exhibited. In addition, the fatty acid to be bonded is more desirably saturated. Moreover, the distilled diglycerin monofatty acid ester may also be used in combination with a sorbitan fatty acid ester.

Embodiments of the oily food according to the invention are not particularly limited. For example, a method in which the oily food is once poured into the edible container such as a monaka shell or a cone, and is attached to the inside of the edible container by rotation or the like of the edible container, and the surplus oily food is then discharged, or a method in which the oily food is sprayed onto the inside of the edible container using a spray can be adopted. In addition, the oily food that has been provided with fluidity can also be employed in a type of chocolate coating device that pours chocolate like a waterfall. A typical example of such a device is a so-called "enrober."

In view of work efficiency in coating, the application by spraying is desired, and the oily food according to the invention is also applicable to such use. The oily food according to the invention is also characterized by showing strong water migration resistance even when being applied by spraying.

A method of preparing the oily food according to the invention is described by taking chocolate as an example.

The method of preparing chocolate can be a conventionally used method. That is, raw materials such as sugar, milk powder and cacao mass, etc. are mixed together and then micronized by a roller and so on. Then, the mixture is heated and knead. The emulsifier as a feature of the invention is desirably added from the beginning as a raw material.

The effects of the invention are further clarified by giving examples hereinafter.

EXAMPLES

○ Discussion 1: Screening of Emulsifier

Examples 1 to 7 and Comparative Examples 1 to 14

Various emulsifiers described in Tables 1 and 2 were added to a base chocolate composition including 46.5 wt % of a vegetable fat, 42.5 wt % of sugar and 11 wt % of cocoa to prepare an oily food. Then, the yield value and the plastic viscosity were measured. The results were also recorded in Tables 1 and 2. A method of measuring the yield value and the plastic viscosity was in accordance with the method described hereinafter.

Moreover, a fractionated palm oil (melting point: 16° C.) was employed as the vegetable fat. The oil content in the cocoa was 11 wt %.

TABLE 1

Compositions and Results of Screening of Emulsifier

|  | Example 1 | Example 2 | Example 3 | Example 4 | Example 5 | Example 6 | Example 7 |
|---|---|---|---|---|---|---|---|
| Name of emulsifier (product name) | Poem DL-100 | L-300 | Poem DS-100A | Poem DM-100 | S-301V | Poem DP-95RF | Sorman S-300V |
| Name of maker | Riken Vitamin | Riken Vitamin | Riken Vitamin | Riken Vitamin | Riken Vitamin | Riken Vitamin | Riken Vitamin |
| Type of emulsifier | Diglycerin monolaurate | Sorbitan monolaurate (sorbitol type) | Diglycerin monostearate | Diglycerin monomyristate | Sorbitan monostearate (sorbitol type) | Diglycerin mono-palmitate:sorbitan tribehenate = 95:5 | Sorbitan monostearate (sorbitol type) |
| HLB | 9.4 | 8 | 7.7 | 8.7 | 5.6 | 7.5 | 5.3 |
| Hydroxyl value | — | 460-500 | — | — | 310-360 | — | 315-345 |
| Amount of emulsifier added (wt %) | 0.5 | 0.5 | 0.5 | 0.5 | 0.5 | 0.5 | 0.5 |
| Viscosity (mPa · s) | 2850 | 2850 | 3200 | 3100 | 2800 | 2900 | 3250 |
| Yield value (Pa) | 2.97 | 3.06 | 3.15 | 3.23 | 3.24 | 3.32 | 4.20 |
| Plastic viscosity (mPa · s) | 191 | 187 | 194 | 190 | 184 | 191 | 214 |
| Oil content in oily food (wt %) | 47.5 | 47.5 | 47.5 | 47.5 | 47.5 | 47.5 | 47.5 |

TABLE 1-continued

Compositions and Results of Screening of Emulsifier

|  | Example 1 | Example 2 | Example 3 | Example 4 | Example 5 | Example 6 | Example 7 |
|---|---|---|---|---|---|---|---|
| Yield value/plastic viscosity | 15.5 | 16.4 | 16.2 | 17.0 | 17.6 | 17.4 | 19.6 |

TABLE 2

Compositions and Results of Screening of Emulsifier

|  | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 | Comparative Example 10 | Comparative Example 11 | Comparative Example 12 | Comparative Example 13 | Comparative Example 14 |
|---|---|---|---|---|---|---|---|---|---|---|---|---|---|---|
| Name of emulsifier (product name) | Without addition | Poem S-60V | ER290 | Poem B100 | Poem B100 | S070 | Lecithin | S770 | S370 | S570 | Poem O-80V | Emasol O-10V | Emasol S-30V | Poem B150 |
| Name of maker | — | Riken Vitamin | Mitsubishi-Kagaku Foods | Riken Vitamin | Riken Vitamin | Mitsubishi-Kagaku Foods | Tsuji Oil Mills Co., Ltd. | Mitsubishi-Kagaku Foods | Mitsubishi-Kagaku Foods | Mitsubishi-Kagaku Foods | Riken Vitamin | Kao | Kao | Riken Vitamin |
| Type of emulsifier | — | Sorbitan monostearate | Sugar ester | Behenic acid monoglyceride | Behenic acid monoglyceride | Sugar ester | Lecithin | Sugar ester | Sugar ester | Sugar ester | Sorbitan monooleate | Sorbitan monooleate | Sorbitan tristearate | Sorbitan tribehenate |
| HLB | — | 5.1 | About 2 | 4.2 | 4.2 | 1 or less | 7-9 | About 7 | About 3 | About 5 | 4.9 | 4.3 | 2.1 | 2.5 |
| Hydroxyl value | — | 235-260 | — | — | — | — | — | — | — | — | 193-209 | 193-209 | 235-260 | 65-95 |
| Amount of emulsifier added (wt %) | — | 0.5 | 0.5 | 0.5 | 1.5 | 0.5 | 0.5 | 0.5 | 0.5 | 0.5 | 0.5 | 0.5 | 0.5 | 0.5 |
| Viscosity (mPa·s) | 2200 | 2700 | 1300 | 840 | 2400 | 1500 | 1800 | 1900 | 2000 | 2100 | 2900 | 2900 | 2950 | 3100 |
| Yield value (Pa) | 1.51 | 2.14 | 0.68 | 0.97 | 2.27 | 0.97 | 1.2 | 1.35 | 1.62 | 1.68 | 2.18 | 2.18 | 2.19 | 2.33 |
| Plastic viscosity (mPa·s) | 288 | 245 | 209 | 153 | 372 | 215 | 220 | 207 | 200 | 199 | 277 | 277 | 264 | 274 |
| Oil content in oily food (wt %) | 47.7 | 47.5 | 47.5 | 47.5 | 47.0 | 47.5 | 47.5 | 47.5 | 47.5 | 47.5 | 47.5 | 47.5 | 47.5 | 47.5 |
| Yield value/plastic viscosity | 5.2 | 8.8 | 3.3 | 6.3 | 6.1 | 4.5 | 5.5 | 6.5 | 8.1 | 8.4 | 7.9 | 7.9 | 8.3 | 8.5 |

"Method of Measuring Yield Value and Plastic Viscosity"
1. The oily food was heated to 60° C. so as to be completely melted.
2. The resultant was left to stand at room temperature, and was cooled to 40° C.
3. The shear stress at a shear rate of 2 (1/s) to 50 (1/s) at 40° C. was measured using RheolabQC (made by Anton Paar Co.).
4. The yield value and the plastic viscosity were calculated by translating the shear stress into a mathematical formula using the Casson approximation formula.

"Method of Preparing an Oily Food"
1. 19.0 wt % of a vegetable fat, 42.5 wt % of sugar and 11 wt % of cocoa were mixed so as to obtain a material.
2. The material was subjected to atomization by a roll refiner.
3. The resultant was mixed with 27.5 wt % of the remaining vegetable fat by a conche, so as to prepare an oily food.

Study

As shown in Tables 1 and 2, by containing 0.2 to 2.5 wt % of a sorbitol type sorbitan monofatty acid ester having an HLB of 5 to 10 or by containing 0.2 to 5 wt % of a distilled diglycerin monofatty acid ester having an HLB of 5 to 10, an oily food showing the intended physical properties can be obtained.

○ Discussion 2: Discussion of Oil Content in Oily Food and Amount of Emulsifier Added Examples 8 to 15

The oil content in the oily food and the amount of the emulsifier added were discussed with respect to Sorman S-300V among the screened emulsifiers.

According to the compositions in Table 3, the oily food was prepared by the same method as in Discussion 1, and its physical properties such as yield value and so on were measured. The results were recorded in Table 3.

TABLE 3

Compositions and Results of Discussion of Oil Content in Oily Food and Amount of Emulsifier Added

|  | Example 8 | Example 9 | Example 10 | Example 11 | Example 12 | Example 13 | Example 14 | Example 15 |
|---|---|---|---|---|---|---|---|---|
| Name of emulsifier (product name) | Sorman S-300V | Sorman S-300V | Sorman S-300V | Sorman S-300V | Sorman S-300V | Sorman S-300V | Sorman S-300V | Sorman S-300V |
| Amount of emulsifier added (wt %) | 1.50% | 1.50% | 1.50% | 1.50% | 0.50% | 0.50% | 0.50% | 0.50% |
| Viscosity (mPa · s) | 7600 | 4200 | 3300 | 1400 | 3250 | 3050 | 2250 | 1600 |
| Yield value (Pa) | 10.24 | 5.46 | 3.37 | 2.24 | 4.2 | 4.1 | 2.8 | 2.1 |
| Plastic viscosity (mPa · s) | 176 | 131 | 108 | 92 | 214 | 129 | 109 | 94 |
| Oil content in oily food (wt %) | 48.0% | 52.0% | 56.0% | 60.0% | 48.0% | 52.0% | 56.0% | 60.0% |
| Yield value/plastic viscosity | 58.2 | 41.7 | 31.2 | 24.3 | 19.6 | 31.8 | 25.7 | 22.3 |

Study

As shown in Table 3, even if the oil content in the oily food and the amount of the emulsifier added are changed, the yield value, the plastic viscosity and the yield value/plastic viscosity will fall within the specified value ranges.

○ Discussion 3: Spray Application Test

Examples 16 to 25 and Comparative Examples 15 to 19

With respect to a part of the oily foods in Discussions 1 and 2, an application test on a monaka shell by spraying and an evaluation of water migration were carried out.

A spray application test method and an evaluation method are described hereinafter.

The results were recorded in Table 4.

"Application Test Method by Spraying"

1. The temperature of each oily food was adjusted to 50° C. so as to completely melt the oily food, and the temperature was then adjusted to 40° C.
2. A monaka shell (monaka shell in the quartered form for confectionery production, made by Kagadane-shokuhinkogyo Co., Ltd.; having a size of 65 mm in length, 65 mm in width and 7 mm in height, and an initial water content of 5.8%) was placed with an opening portion on the top. The oily food obtained in step 1 was applied using an electric spraying machine (Power Spray P-60 made by Seiwa Sangyo Co., Ltd.) and was adjusted to have a weight of 2.5 to 2.7 g per unit area. Moreover, a radius of curvature of a corner part of the monaka shell was 1 mm.
3. The monaka shell was immediately placed in a freezer to congeal the oily food.
4. Uniformity in thickness of the oily food at convex and concave portions of the monaka shell was observed by naked eyes.

"Method of Evaluating Water Migration"

1. An ice cream ("Family Vanilla" made by Meiji Dairies Corporation) was heated to −5 to −10° C.
2. The resultant was placed in a pastry bag and 17 g thereof was filled into the monaka shell coated with the oily food by the procedure described in the section of "Application test method by spraying." Ten monaka shells were filled in each testing area.
3. The resultant was quickly placed in a freezer at −30° C. and left to stand for 120 minutes.
4. An oily food including 46.5 wt % of a vegetable fat with a melting point of 16° C., 42.5 wt % of sugar and 11 wt % of cocoa was melted in a hot water bath at 50° C., and 3.5 to 4.0 g of the resultant was spread over the ice cream part of the resultant obtained in step 3 from above, so as to coat the surface of the ice cream.
5. The resultant was quickly placed in a freezer at −30° C. and left to stand for 120 minutes.
6. The resultant was packed in individual plastic bags and then placed in a freezer at −25° C. for 3 days to obtain an ice monaka for testing.
7. The ice monaka for testing was placed in a freezer at −10° C. and left to stand for 21 days.
8. At the stage of day 21, the number of monaka shells which absorbed moisture and changed in shape was confirmed by visual observation.

A case where the number of monaka shells which absorbed moisture and changed in shape was 3 or fewer out of 10 was regarded as a pass.

9. With respect to the monaka shell which, according to visual observation, did not change in shape due to moisture absorption, the monaka shell was separated from the ice cream or the like and then measured for water content, and an average value thereof was obtained.

An average water content of 10 wt % or less was regarded as a pass.

10. With respect to the monaka shell which did not change in shape due to moisture absorption, the texture was evaluated by ten panelists based on the "Texture Evaluation Criteria." The evaluation results were determined by mutual consent of the panelists.

(Texture Evaluation Criteria)
○: Crispness remained and the texture was good.
Δ: Slight moistness was felt, but crispness remained.
x: The monaka shell was wet and not good.
The results Δ and ○ were regarded as a pass.

TABLE 4

| | Results | | | | | | | | | | | | | | |
|---|---|---|---|---|---|---|---|---|---|---|---|---|---|---|---|
| | Example 16 | Example 17 | Example 18 | Example 19 | Example 20 | Example 21 | Example 22 | Example 23 | Example 24 | Example 25 | Comparative Example 15 | Comparative Example 16 | Comparative Example 17 | Comparative Example 18 | Comparative Example 19 |
| Oily food employed | Example 6 | Example 7 | Example 8 | Example 9 | Example 10 | Example 11 | Example 12 | Example 13 | Example 14 | Example 15 | Comparative Example 1 | Comparative Example 2 | Comparative Example 5 | Comparative Example 7 | Comparative Example 8 |
| Emulsifier product name | Poem DP-95RF | Sorman S-300V | Sorman S-300V | Sorman S-300V | Sorman S-300V | Sorman S-300V | Sorman S-300V | Sorman S-300V | Sorman S-300V | Sorman S-300V | Without addition | Poem S-60V | Poem B100 | Lecithin | S770 |
| Evaluation of spray coating test | 4 | 4 | 5 | 5 | 5 | 4 | 4 | 5 | 4 | 4 | 1 | 2-3 | 2 | 0 | 2 |
| Number (out of 10) of monaka which has absorbed moisture on day 21 | 1 | 1 | 0 | 0 | 0 | 1 | 1 | 0 | 1 | 2 | 9 | 4 | 8 | 10 | 9 |
| Water content in monaka which has not absorbed moisture on day 21 | 8.9 | 9.5 | 7.6 | 8 | 7.9 | 7.2 | 9.5 | 9.2 | 9.2 | 8.5 | 13.5 | 8.8 | 8.9 | — | 12.2 |
| Texture | ○ | ○ | ○ | ○ | ○ | ○ | ○ | ○ | ○ | ○ | Δ | ○ | ○ | X | Δ |

Study

As shown in Table 4, when an oily food having a yield value or plastic viscosity within a specific range is employed, the application onto the monaka shell by spraying was satisfactorily performed and water migration in the ice monaka is also inhibited.

○ Discussion 4: Application Test by Means Other than Spraying

Examples 26 to 28 and Comparative Examples 20 to 24

With respect to a part of the oily foods obtained in Discussion 1, a coating test was conducted by a method other than spraying onto the monaka shell.
The test method is as described hereinafter.
The results were shown in Table 5.
"Coating Test Method"
1. The temperature of each of the oily foods described in Table 5 was adjusted to 50° C. so as to completely melt the oily food.
2. A monaka shell (monaka shell in the quartered form for confectionery production, made by Kagadane-shokuhinkogyo Co., Ltd.; having a size of 65 mm in length, 65 mm in width and 7 mm in height, and an initial water content of 5.8%) was placed with an opening portion on the top. The oily food obtained in step 1 was poured to fully fill the inside of the monaka shell and then the monaka shell was immediately placed vertically to allow the oily food to flow out. Moreover, a radius of curvature of a corner part of the monaka shell was 1 mm.
3. The weight per unit area was measured.
4. The resultant was immediately placed in a freezer to congeal the oily food.
5. When the weight per unit area did not fall in the range of 2.5 to 2.7 g per piece of monaka shell, the process was restarted from step 1. The time taken for the oily food of step 2 to flow out was adjusted so as to achieve the above predetermined weight per unit area.
6. The thickness of the oily food at convex and concave portions of the monaka shell was observed by naked eyes.

(Evaluation Criteria for Naked-Eye Observation of Coating Test)
5: No thin portion was observed, the coating was uniformly performed, and the result was good.
4: 90% or more of the internal phase was uniformly coated according to visual observation.
3: Uneven thickness of the coating was observed at a part of the convex and concave portions.
2: Uneven thickness of the coating was observed all over the convex and concave portions.
1: There was a very large unevenness in thickness of the coating at the convex and concave portions.
The result of 3 or greater was regarded as a pass.
(In Table 5, the results were recorded as "results of coating test.")
"Moisture-proof Test Method"
1. An ice cream ("Family Vanilla" made by Meiji Dairies Corporation) was heated to −5 to −10° C.
2. The resultant was placed in a pastry bag and 17 g thereof was filled into the monaka shell coated with the oily food by the procedure described in the section of "Coating test method." Ten monaka shells were filled in each testing area.

3. The resultant was quickly placed in a freezer at −30° C. and left to stand for 120 minutes.
4. An oily food including 46.5 wt % of a vegetable fat with a melting point of 16° C., 42.5wt % of sugar and 11 wt % of cocoa was melted in a hot water bath at 50° C., and 3.5 to 4.0g of the resultant was spread over the ice cream part of the resultant obtained in step 3 from above, so as to coat the surface of the ice cream.
5. The resultant was quickly placed in a freezer at −30° C. and left to stand for 120 minutes.
6. The resultant was packed in individual plastic bags and then placed in a freezer at −25° C. for 3 days to obtain an ice monaka for testing.
7. The ice monaka for testing was placed in a freezer at −10° C. and left to stand for 21 days.
8. At the stage of day 21, the number of monaka shells which absorbed moisture and changed in shape was confirmed by visual observation.
A case where the number of monaka shells which absorbed moisture and changed in shape was 4 or fewer out of 10 was regarded as a pass.
9. With respect to the monaka shell which, according to visual observation, did not change in shape due to moisture absorption, the monaka shell was separated from the ice cream or the like and then measured for water content, and an average value thereof was obtained.
An average water content of 10 wt % or less was regarded as a pass.
10. With respect to the monaka shell which did not change in shape due to moisture absorption, the texture was evaluated by ten panelists based on the "Texture Evaluation Criteria." The evaluation results were determined by mutual consent of the panelists.
(Texture Evaluation Criteria)
○: Crispness remained and the texture was good.
Δ: Slight moistness was felt, but crispness remained.
x: The monaka shell was wet and the texture was not good.
The results Δ and ○ were regarded as a pass.

When a predetermined oily food was employed, the number of monaka shells which changed in shape due to moisture absorption became 4 or fewer at the stage of day 21, and the water content in the monaka shell which did not change in shape due to moisture absorption became 10 wt % or less.

Study

It is inferred that the inhibition of water migration by means of the oily food includes two elements: even application onto a monaka shell and the barrier properties after application.

It is confirmed that the oily food according to the invention has both good application properties and barrier properties, and is capable of solving the problems.

What is claimed is:
1. An oily food for inhibiting water migration in frozen confectionery, satisfying the following requirements:
 (1). having a yield value of 1.7 to 12 Pa at 40° C.;
 (2). having plastic viscosity of 70 to 260 mPa·s at 40° C.;
 (3). having a value of yield value/plastic viscosity of 10 or greater, wherein the calculation is performed by using mPa as a unit of yield value and mPa·s as a unit of plastic viscosity; and
 (4). having an oil content of 44 to 80 wt %, and containing 0.2 to 2.5 wt % of a sorbitol type sorbitan monofatty acid ester having an HLB of 5 to 10.
2. The oily food according to claim 1, satisfying the following requirements:
 (1). having a yield value of 3 to 12 Pa at 40° C.;
 (2). having plastic viscosity of 100 to 180 mPa·s at 40° C.;
 (3). having a value of yield value/plastic viscosity of 25 or greater, wherein the calculation is performed by using mPa as a unit of yield value and mPa·s as a unit of plastic viscosity; and
 (4). having an oil content of 46 to 70 wt %.
3. The oily food according to claim 1, wherein the fatty acid of the sorbitol type sorbitan monofatty acid ester is saturated.

TABLE 5

Results of Coating Test

| | | Example 26 | Example 27 | Example 28 | Comparative Example 20 | Comparative Example 21 | Comparative Example 22 | Comparative Example 23 | Comparative Example 24 |
|---|---|---|---|---|---|---|---|---|---|
| Oily food employed | | Example 6 | Example 7 | Example 8 | Comparative Example 1 | Comparative Example 2 | Comparative Example 5 | Comparative Example 7 | Comparative Example 8 |
| Results of coating test | | 4 | 5 | 5 | 1 | 2 | 2-3 | 1 | 2 |
| Results of moisture proof test | Number (out of 10) of monaka shell which absorbed moisture on day 21 | 1 | 1 | 0 | 9 | 8 | 6 | 10 | 9 |
| | Water content in monaka shell which has not absorbed moisture on day 21 | 8.9 | 9.5 | 7.6 | 13.5 | 8.9 | 7.8 | — | 12.2 |
| | Texture | ○ | ○ | ○ | Δ | ○ | ○ | X~Δ | Δ |

4. Use of the oily food according to claim 3 as an internal phase coating agent for an edible container in a frozen confection which uses the edible container.

5. A method of producing frozen confectionery which uses an edible container, comprising coating the oily food according to claim 3 onto an internal phase of the edible container in a frozen confection which uses the edible container.

6. A method of producing frozen confectionery which uses an edible container, comprising coating, by spraying, the oily food according to claim 3 onto an internal phase of the edible container in a frozen confection which uses the edible container.

7. Use of the oily food according to claim 1 as an internal phase coating agent for an edible container in a frozen confection which uses the edible container.

8. A method of producing frozen confectionery which uses an edible container, comprising coating the oily food according to claim 1 onto an internal phase of the edible container in a frozen confection which uses the edible container.

9. A method of producing frozen confectionery which uses an edible container, comprising coating, by spraying, the oily food according to claim 1 onto an internal phase of the edible container in a frozen confection which uses the edible container.

* * * * *